(12) United States Patent
Owechko et al.

(10) Patent No.: US 7,613,357 B2
(45) Date of Patent: Nov. 3, 2009

(54) METHOD FOR WARPED IMAGE OBJECT RECOGNITION

(75) Inventors: Yuri Owechko, Newbury Park, CA (US); Swarup Medasani, Malibu, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 572 days.

(21) Appl. No.: 11/231,327

(22) Filed: Sep. 20, 2005

(65) Prior Publication Data

US 2007/0065014 A1    Mar. 22, 2007

(51) Int. Cl.
*G06K 9/40* (2006.01)
(52) U.S. Cl. .................. 382/275; 382/190; 382/293
(58) Field of Classification Search ............. 382/181, 382/190, 195, 199, 276, 280, 285, 130, 151–154, 382/294, 131, 128, 141–143
See application file for complete search history.

(56) References Cited

U.S. PATENT DOCUMENTS

| | | | | |
|---|---|---|---|---|
| 5,539,868 | A * | 7/1996 | Hosoya et al. | 345/471 |
| 5,999,660 | A * | 12/1999 | Zorin et al. | 382/276 |
| 6,421,049 | B1 * | 7/2002 | Reinhardt et al. | 345/420 |
| 6,538,691 | B1 * | 3/2003 | Macy et al. | 348/222.1 |
| 6,611,615 | B1 * | 8/2003 | Christensen | 382/130 |
| 6,718,291 | B1 * | 4/2004 | Shapiro et al. | 703/2 |
| 7,006,707 | B2 * | 2/2006 | Peterson | 382/285 |
| 7,071,936 | B2 * | 7/2006 | Hoppe et al. | 345/420 |
| 7,085,430 | B2 * | 8/2006 | Winsor et al. | 382/275 |
| 7,088,392 | B2 * | 8/2006 | Kakarala et al. | 348/272 |
| 7,127,100 | B2 * | 10/2006 | Wenzel et al. | 382/154 |
| 7,245,761 | B2 * | 7/2007 | Swaminathan et al. | 382/154 |
| 2008/0175514 | A1 * | 7/2008 | Nose et al. | 382/275 |

OTHER PUBLICATIONS

Li et al., "Numerical algorithm for image geometry transformation", IEEE Transactions on Systems, Man, and Cybernetics-Part B: Cybernetics, vol. 34, No. 1, February 2004, pp. 132-148.*
Tamaki et al., "Correcting Distortion of Image by Image Registration", ACCV2002: The 5th Asian Conference on Computer Vision, Jan. 23-25, 2002, Melbourne, A ustralia, pp. 1-6.*
Tamaki Toru "Unified Approach to Image Distortion: D-U and U-D Models" IEICE Trans. INF & Syst., vol. E88-D, No. 5 May 2005. pp. 1089-1090.*
Giulianini et al., "Transformational properties of integral transforms of images"J. Opt. Soc. Am. A/vol. 9, No. 3/Mar. 1992, pp. 494496.*
Larry Green, "Vector Calculus: Jacobian" http://ltcconline.net/greenl/courses/202/multipleIntegration/jacobians.htm,These lecture notes are from Fall 2002, pp. 1-6.*
Umberto Castellani, Vincent Gay-Bellile;and Adrien Bartoli, "Joint Reconstruction and Registration of a Deformable Planar Surface Observed by a 3D Sensor"; Sixth International Conference on 3-D Digital Imaging and Modeling IEEE, 2007, pp. 1-8.*
Viola and Jones, "Rapid Detection Using a Boosted Cascade of Simple Features", CVPR 2001, 0-7695-1272-0/01 IEEE, 1-511 thru I-518.
Lienhart and Maydt, "An Extended Set of Haar-like Features for Rapid Object Detection", ICIP 2003.

* cited by examiner

*Primary Examiner*—Samir A Ahmed
*Assistant Examiner*—Mekonen Bekele (57) ABSTRACT

A computer vision system includes distorting optics producing distorted or warped input images. The system includes an integral feature object classifier trained using an undistorted image space. Undistorted integral feature values are calculated directly from distorted input images without undistorting or dewarping the distorted input image.

9 Claims, 5 Drawing Sheets

Edge features

Line features

Center-surround features

METHOD FOR WARPED IMAGE OBJECT RECOGNITION

TECHNICAL FIELD

The present invention is related to computer vision object recognition. More particularly, the invention is concerned with object recognition from distorted images.

BACKGROUND OF THE INVENTION

Certain computer vision systems require wide field of view. For example, in one automotive application, it is desirable to sense wide fields around the vehicle for pedestrians, vehicles, and other objects for collision warning, avoidance, and mitigation. Detecting landmarks visually and enhancing situational awareness and vehicle location accuracy is another automotive application. Very wide angle occupant sensing for security, child monitoring, and smart airbag systems are yet other examples of automotive applications. Surveillance and perimeter security are examples of other non-automotive applications. In all of these applications and others not separately mentioned, it is generally thought to be cost-effective and efficient from a packaging perspective to use a single high-resolution video sensor or camera with a wide-angle or omnivision lens or a spherical mirror/lens combination (catadioptrics) than to combine video streams from multiple video sensors or camperas looking in different directions.

Almost all computer vision object recognition algorithms assume that the optical system is space-invariant and that an object appears the same no matter where it is in the image. This may be an acceptable approximation with most conventional optics. However, certain object recognition applications may benefit from the use of wide-angle or omnivision lenses or a catadioptric arrangement in order to sense as much of the field around the camera as possible. Projections of such wide-angle scenes onto a two-dimensional image necessarily results in space-variant distortions of objects, especially near the edges of the image.

Known approaches to object recognition require either that multiple classifiers be trained for different spatial regions in the image or a computationally expensive unwarping of the entire image be performed for each frame prior to use of a conventional classifier trained for undistorted features. In unwarping the image is undistorted by compensating for radial and perspective distortions so that object shape and orientation are preserved. Since these operations must be performed for each image frame, the computational burden and cost are high and increase with increasing image resolution.

SUMMARY OF THE INVENTION

In the present invention, classification is performed using the distorted input image without unwarping and using the same classifier everywhere in the image. Only a single classifier developed using undistorted images is required. The same classifier may be used with any camera and lens/optics combination, which will reduce the cost of the vision system and its development and application deployment since the same classifier may then be used for many varied applications. The present invention can be used to recognize objects in any distorted image where the distortion can be described by a continuous one-to-one vector transformation.

The present invention includes computer vision object recognition methods which can be used with any distorting optics without changing the classifier. By restricting the object feature set to integral features based on integration of small regions in the input image, creating a classifier based on undistorted training images, and utilizing Jacobian determinant based transformations for double integration, an object recognition system can be created for any distorting lens without any changes to the classifier and without undistorting the input image. The present invention provides for the calculation of undistorted feature values using distorted input images, thereby reducing computational requirements and greatly increasing the range of applicability of computer vision algorithms by allowing a common classifier to be used with wide-angle, fisheye, omnivision, and other specialized space-variant optics in an object recognition system.

In accordance with one aspect of the present invention, a method for calculating undistorted integral features directly from a distorted input image for use in a computer vision object recognition system includes integrating over a predetermined region the product of a distorted input image captured in a distorted image space and a predetermined vector transformation between an undistorted image space and the distorted image space. Undistorted integral features may be rapidly calculated by referencing a plurality of integral image values of the distorted integral image delimited by the predetermined region, factoring the referenced integral image values by the predetermined vector transformation, and algebraically combining the factored integral image values.

In accordance with another aspect of the present invention, a method for calculating undistorted integral features directly from a distorted input image for use in a computer vision object recognition system trained on undistorted images includes providing a Jacobian determinant relating a distorted image space to an undistorted image space, calculating and storing an integral image from the distorted input image, and calculating undistorted integral features using Jacobian integral image values based on the distorted image and the provided Jacobian determinant. Undistorted integral features may be calculated by integrating over a predetermined region the product of the distorted image and the Jacobian determinant. Further, undistorted integral features may be rapidly calculated by referencing a plurality of integral image values of the integral image delimited by the predetermined region, factoring the referenced integral image values by the Jacobian determinant, and algebraically combining the factored integral image values.

In accordance with another aspect of the present invention, a method for object recognition in a computer vision system having a distorted input image includes providing an integral feature object classifier trained using an undistorted image space, providing a transformation mapping of a distorted image space to the undistorted image space, providing a distorted input image captured in the distorted image space, calculating undistorted integral features from the distorted input image based on the transformation mapping, and recognizing objects in the distorted input image based on the calculated undistorted integral features and the provided integral feature object classifier. Undistorted integral features may be calculated by integrating over a predetermined region the product of the distorted image and the transformation mapping. Further, undistorted integral features may be rapidly calculated by calculating and storing an integral image from the distorted input image, referencing integral image values of the integral image delimited by the predetermined region, and algebraically combining the integral image value.

BRIEF DESCRIPTION OF THE DRAWINGS

These and other aspects of the present invention will be more fully understood with reference to the description herein below and the following drawings in which.

DESCRIPTION OF THE PREFERRED EMBODIMENT

As used herein, the terms warped and distorted may be use interchangeably and the terms dewarped, unwarped and undistorted may be used interchangeably.

Figure 1:
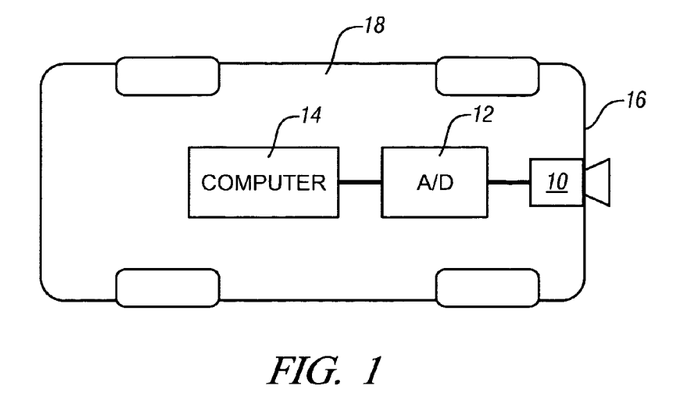
FIG. 1 is a diagrammatic representation of an automotive application of an object recognition system in accordance with the present invention.

As shown in FIG. 1, exemplary hardware used to implement the method of the invention comprises a black and white, color, or near-IR CCD video camera 10 including wide-angle optics, such as what is commonly referred to a fish-eye lens. Such a camera can be mounted in an appropriate location for the particular application. In the present exemplary implementation, the camera 10 is shown mounted to the rear portion 16 of a vehicle 18. An analog-to-digital converter 12 couples the camera output to a computer 14. Alternative hardware arrangements will be apparent to those having ordinary skill in the art and may include, for example, catadioptric optics including semi-spherical or other curvature mirrors for reflective image collection, or video sensors having integrated CCD elements and digitization circuitry.

The computer 14 may include single or multiple controllers operating independently or in a cooperative or networked fashion and comprise such common elements as a microprocessor, read only memory ROM, random access memory RAM, electrically programmable read only memory EPROM, hard-drive memory, high speed clock, analog to digital (A/D) and digital to analog (D/A) circuitry, and input/output circuitry and devices (I/O) and appropriate signal conditioning and buffer circuitry. Computer 14 has stored therein, in the form of computer executable program code and various calibration data sets in the form of look-up tables, algorithms for effecting steps, procedures and processes related to the present invention, including algorithms for processing the images sensed by the camera. One main algorithm for processing the image is disclosed herein. This algorithm implements a method for object recognition directly from a warped input image without the requirement for dewarping.

Figure 2:
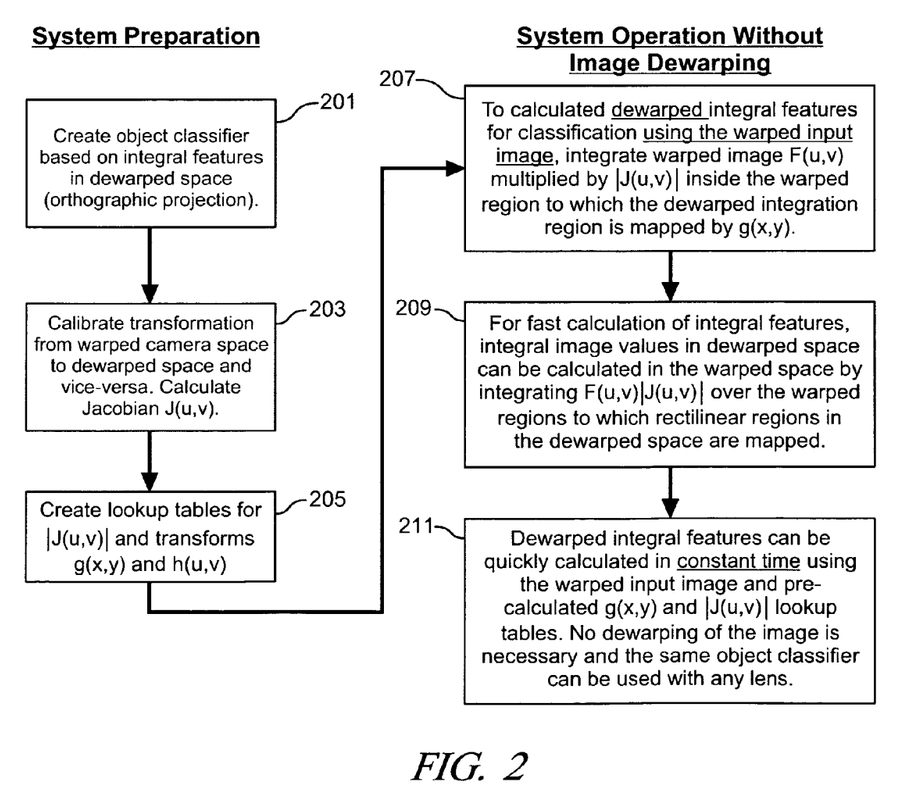
FIG. 2 is a schematic flow representation of preparatory and operational aspects of a system in accordance with the present invention.

Various aspects of a computer vision object recognition system receiving distorted or warped image inputs in accordance with the present invention are illustrated in FIG. 2. Such as system is generally bifurcated into preparatory aspects and operational aspects as shown. At block 201 is illustrated the creation and training of an object classifier based upon undistorted or orthogonal image space. A computer vision object recognition system in accordance with the present invention requires and benefits from a particular type of object classifier (i.e. statistical model) for use in object detection during operation. The object classifier is trained with respect to undistorted images and directly applicable thereto. Beneficially, such a classifier, once developed or created, is applicable across a variety of computer vision object recognition systems of an infinite variety of input image distortions in accordance with application specific optics and imaging hardware. Image classifier compatibility with the method of the present invention requires that the classifier be based upon integral features (i.e. based on integrating local regions of an image). An object classifier is created or trained as generally described herein below with respect to a preferred manner of such classifier training.

Figure 3:
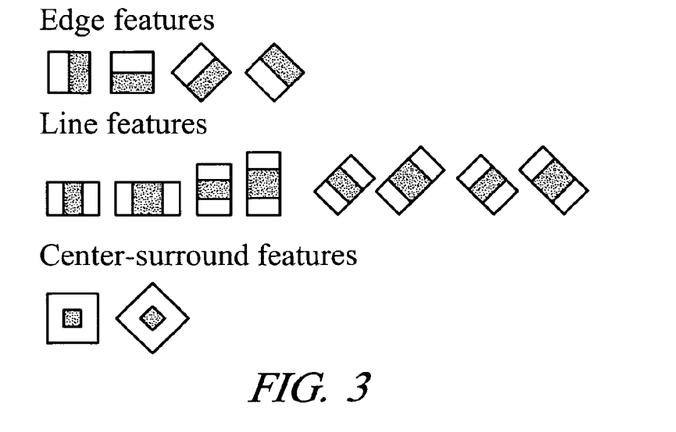
FIG. 3 is a graphic representation of exemplary integral features for use in accordance with the present invention.
Figure 4:
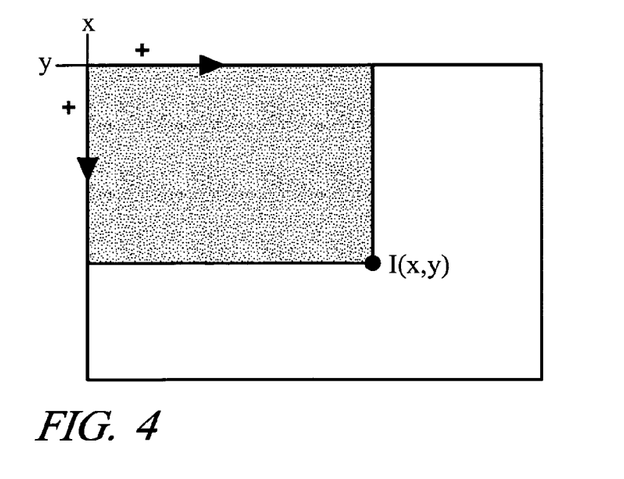
FIG. 4 is a graphic representation of general integral image aspects of undistorted space in accordance with the present invention.

The general approach to the classifier training as understood by those skilled in the art relies upon a training set of images comprising multiple positive samples or images of the desirably detected object class, and multiple negative samples or images that do not contain the desirably detected object class. Features are extracted from the training samples and certain distinctive features used to classify the object are selected. This information is then compressed into the statistical model parameters. Preferably, training of the classifier for use in the present invention utilizes, for example, an extended set of Haar-like integral features as generally shown in FIG. 3, and a cascade of boosted classifiers as a statistical model. More or less complex sets of integral features may be employed in accordance with the nature of the images of interest among other factors and considerations. A relatively large set of very simple "weak" classifiers that use a single integral feature to classify the image region is presently exemplified. Each integral feature consists of two or three joined "black" and "white" rectangles, either up-right or rotated by 45°. An integral feature's value is calculated as a weighted sum of two components wherein image pixels in the white areas are added while those in the black areas are subtracted to form the final feature value. Thus each feature can be broken down into integrations of the image over specific rectilinear regions in the undistorted space. Such pixel summation over a multiplicity of such features is computationally intensive and burdensome. However, a fast calculation method for integral features is known and practiced herein. With additional reference to FIG. 4 and the integral image $I(x,y)$ (i.e. the integral image at $(x,y)$) is simply the sum of all image pixels whose column indices are less than x and row indices are less than y.

Figure 5:
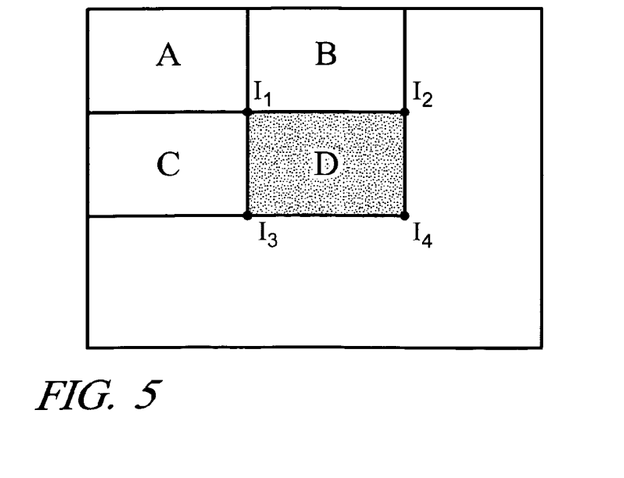
FIG. 5 is a graphic representation of specific area integral images useful in exemplifying efficient image integral calculations in accordance with the present invention.

Therefore, once the integral image is calculated and stored in an indexable array (i.e. look-up table), any integral feature value can be calculated in constant time using only a small number of table lookups. For example, as shown in FIG. 5, the sum of pixels within shaded rectangle (D) can be calculated using four integral image values in accordance with the following relationship:

$$D = I_4 + I_1 - (I_2 + I_3) = (A+B+C+D) + A - ((A+B)+(A+C)) \quad (1)$$

Features consisting of one, two, three or four rectangles can be calculated using four, six, eight or nine table lookups, respectively. By first calculating the integral image and storing the data in a look-up table, the overall computational cost of calculating the integral features can be greatly reduced even including the resource utilization required by the integral image calculations.

Weak classifiers are thus developed and known boosting techniques employed to develop therefrom more complex and robust classifiers, such as through iterative processes utilizing the summation of weighted weak classifiers. Here again, a known technique for improved efficiency is preferably employed wherein cascading several boosted classifiers of increasing complexity are developed which, when employed during detection, allows for rejection of a substantial majority of undesirable objects relatively early in the classification process.

One skilled in the art will appreciate from the forgoing explanation one manner in which a classifier for use in the present invention may be constructed. Other classification training will be recognized by those skilled in the art and are not separately discussed herein.

At block 203 is illustrated preparatory aspects related to the specific application system optics hardware and resultant distortive effects. Such aspects entail calibration of transformations from the distorted input image space to the undistorted classifier image space and vice-versa.

Figure 6:
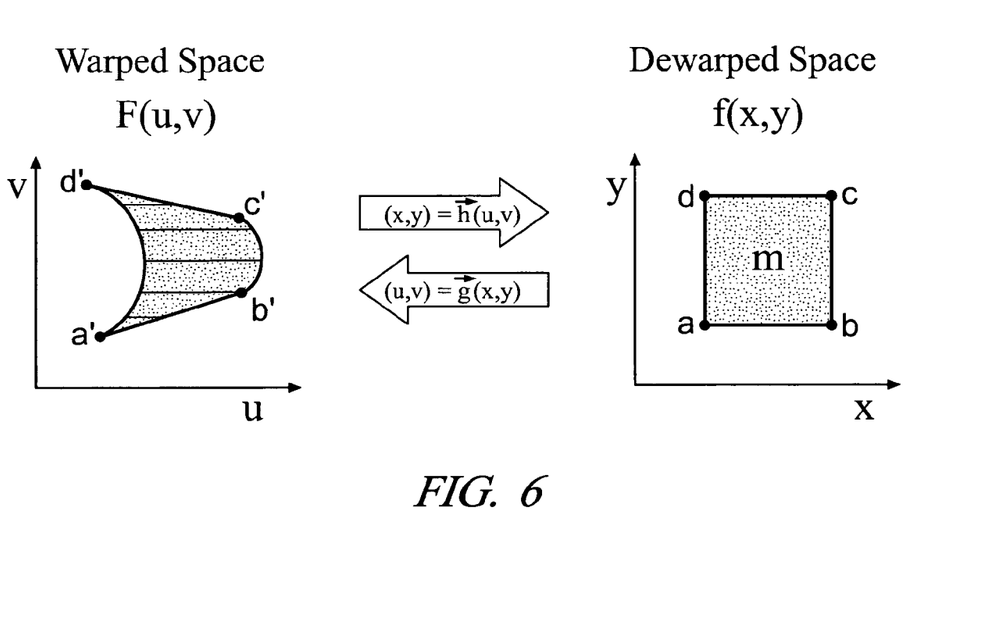
FIG. 6 is a graphic representation of general warped and unwarped space and vector transformations therebetween in accordance with the present invention.

With additional reference to FIG. 6, a pictorial representation of the transformations is illustrated. Warped input image space is illustrated and labeled with respect to coordinates (u,v) whereas unwarped classifier image space is illustrated and labeled with respect to coordinates (x,y). Vector transformations from warped to unwarped space are represented in accordance with the following relationship:

$$(x,y) = \vec{h}(u,v) \quad (2)$$

And, vector transformations from unwarped to warped space are represented in accordance with the following relationship:

$$(u,v) = \vec{g}(x,y) \quad (3)$$

By virtue of these vector transformations, the rectilinear regions in the unwarped image are transformed to curvilinear regions in the warped image. A key theorem used for this aspect is the transformation formula for double integrals which states that the integral of a unwarped image, f(x,y), over any unwarped region can be calculated by integrating the warped image, F(u,v), multiplied by the Jacobian determinant, |J(u,v)|, over the corresponding warped region. The Jacobian determinant is set forth below in the following relationship:

$$|J(u,v)| = \begin{vmatrix} \frac{\partial x}{\partial u} & \frac{\partial y}{\partial u} \\ \frac{\partial x}{\partial v} & \frac{\partial y}{\partial v} \end{vmatrix} = \frac{\partial x}{\partial u}\frac{\partial y}{\partial v} - \frac{\partial y}{\partial u}\frac{\partial x}{\partial v} \quad (4)$$

Both the transform g(x,y) and Jacobian determinant |J(u,v)| are precalculated and stored as lookup tables. Advantageously, once the transformations are stored in the form of lookup tables, no unwarping of the input images will be necessary during operation.

Calibration of the transformations [block 203] may be performed empirically using the particular distorting lens or optics and a calibration chart. The calibration chart is imaged using the distorting optics. Standard models for the optical distortion are then used to arrive at an undistorted calibration chart through parameter adjustments to the model. The model parametric data provide the basis for construction of table data representing the Jacobian determinant (which incorporates the transformation from the warped to the unwarped space). In essence, an inversion of the standard model through parametric adjustments yields the transformation from unwarped to warped space and provides the basis for construction of table data representing same. Calibration tables of desired granularity and resolution are thereby constructed [block 205] and stored in data sets, such as in non-volatile memory in a controller implementation.

System operation practice is illustrated in reference to blocks 207-211 of FIG. 2. During system operation, unwarped integral feature values can be calculated using the warped input image by integrating the warped image, F(u,v), multiplied by the Jacobian determinant, |J(u,v)|, over the warped region to which the unwarped integration region is mapped by the transform g(x,y) [block 207]. In this way the input image never has to be unwarped and the classification can be performed using the classifier trained with undistorted images as previously described. It can be appreciated here that one such common classifier may be applied to varied systems in accordance with transforms and Jacobian determinants specifically calibrated to the particular distortive optics of the particular application. Here, the region of interest in the dewarped space is defined or selected and mapped to the corresponding region in the warped space. For example, in certain object recognition applications it may be determined that looking for objects (e.g. human subjects) should be limited to particular areas in the dewarped space (e.g. toward the edge limits of the image). Hence, such considerations will define where within the dewarped space object recognition is to be applied and those regions are mapped to the warped space using the stored dewarped to warped transformation data as represented in the relationship (3) set forth herein above. So a predetermined sub-region of an entire dewarped image space in accordance with the particular application maps to the corresponding sub-region in the warped image space and it is within such sub-regions that the integration of the warped image and Jacobian determinant combination is performed to yield the result corresponding directly to the dewarped image space without any actual dewarping of the warped image.

Figure 7:
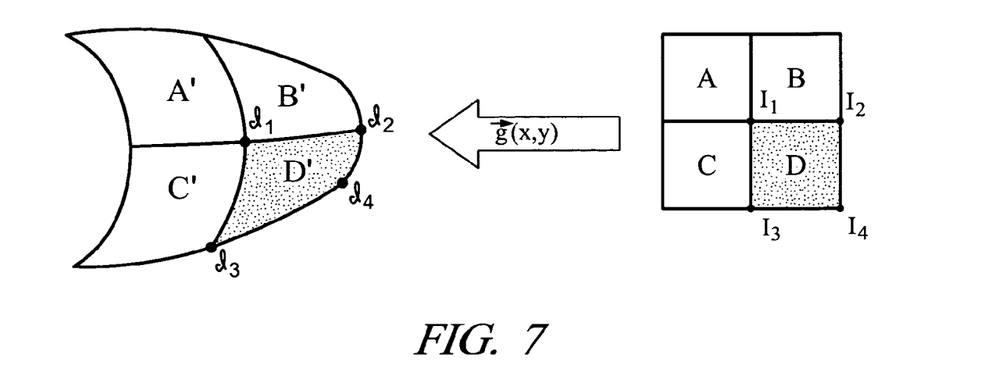
FIG. 7 is a graphic representation of specific area warped and unwarped space useful in exemplifying efficient image integral calculations in accordance with the present invention.

With further reference to block 209 of FIG. 2 and as demonstrated in FIG. 7, the fast calculation practice is preferably extended to the use of integral images in the distorted space for fast calculation of integral feature values in accordance with the present invention. Generally, the integral image in unwarped space I(x,y) can be calculated directly from the warped image using the Jacobian integral image in warped space:

$$I(u,v) = \int\int F(u',v')|J(u',v')|du'dv' = \int\int F(x,y)dxdy = I(x,y) \quad (5)$$

Here, the integration is performed over the warped curvilinear region transforms of the unwarped rectilinear integration regions. It follows then that the integral of region D in unwarped space can be calculated using four warped Jacobian integral image values:

$$D = I_4 + I_1 - (I_2 + I_3) \quad (6)$$

So, in practicing the fast calculation technique, the warped integral image is calculated and stored for reference in the fast determinations of integral features in a manner analogous to fast calculations in dewarped images. Hence, the warped integral image comprises a multiplicity of stored and indexable integral image values corresponding to each pixel index (u,v) in the warped image.

Using the Jacobian integral image, the unwarped integral features can be quickly calculated in constant time using the warped input image and pre-calculated g(x,y) and |J(u,v)| lookup tables. No unwarping of the input image is required and the same object classifier can be used with any lens [block 211].

Figure 8:
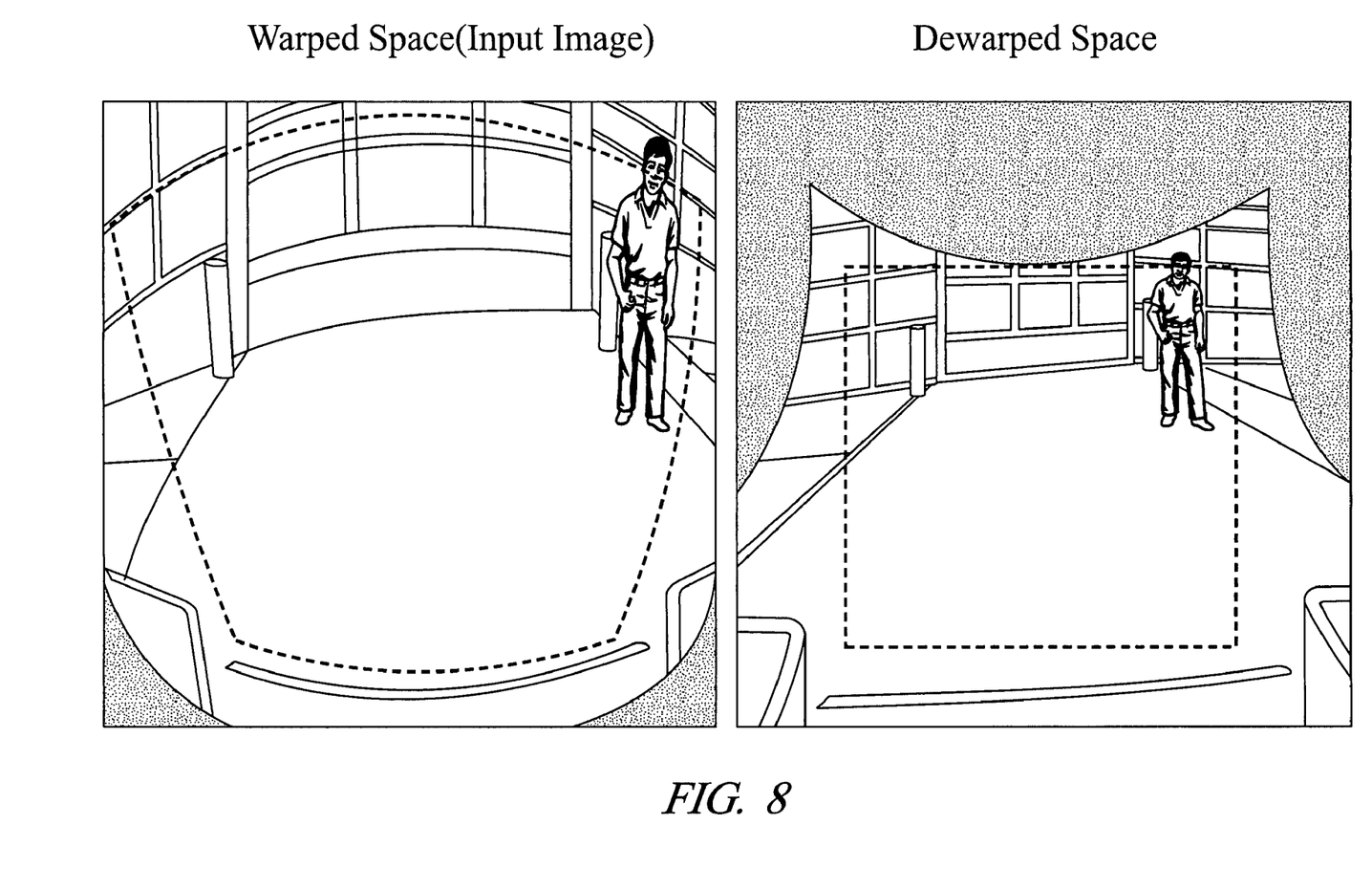
FIG. 8 is a graphic pictorial representation of an image and first region in warped and corresponding unwarped space in accordance with the present invention.
Figure 9:
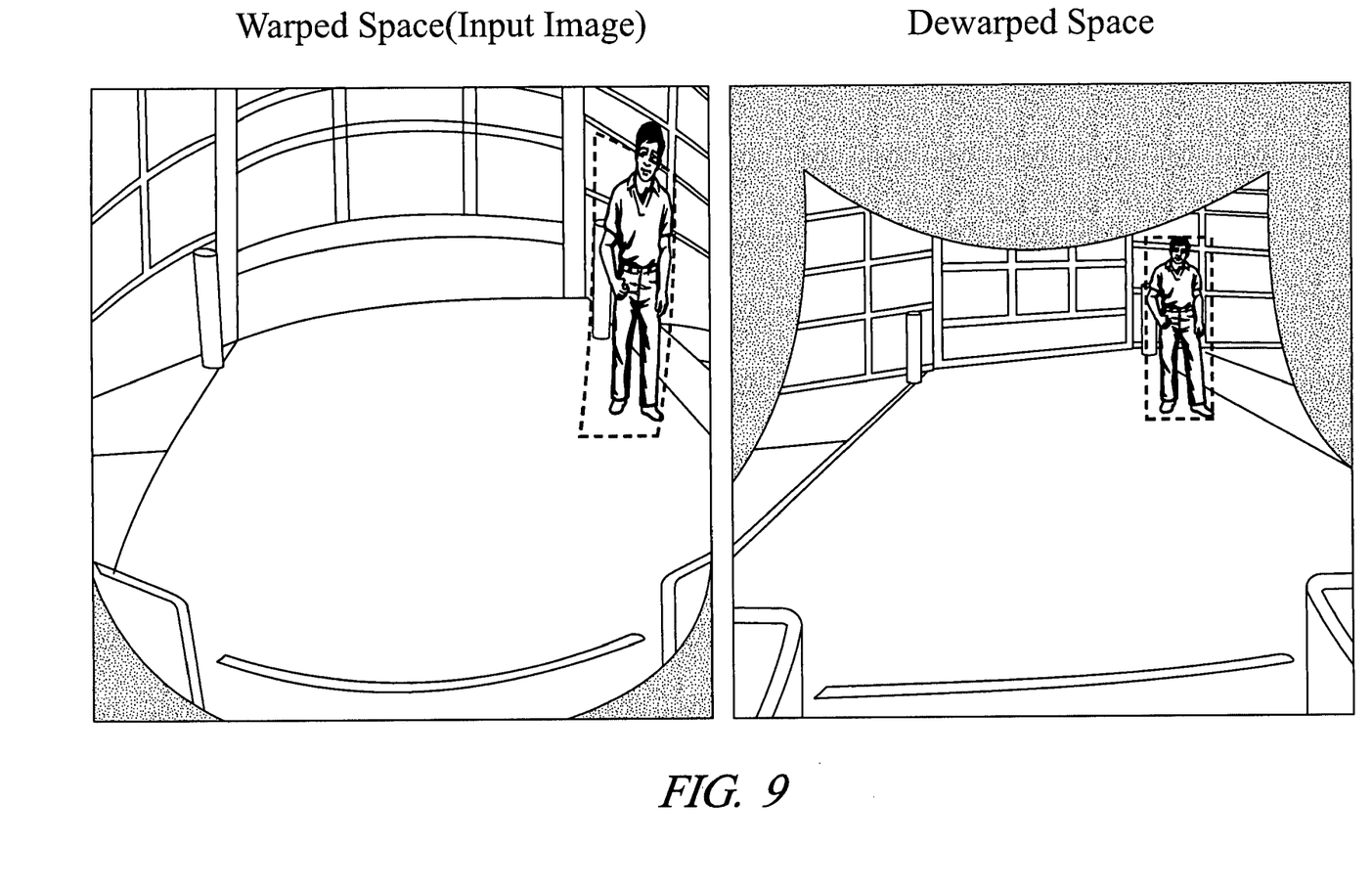
FIG. 9 is a graphic pictorial representation of a region and second region in warped and corresponding unwarped space in accordance with the present invention.

The described technique has been successfully demonstrated. Typical results from the Jacobian method for calculating integral feature values in unwarped images without actual unwarping of the warped input image are shown in FIGS. 8 and 9. The optical system providing the input images employs a 110 degree wide-angle video camera. The camera is mounted to the back of a vehicle. In addition to the radial distortion due to the wide field of view of the lens, perspective distortion was also present owing to a 30 degree downward pointing angle of the camera relative to horizontal. The radial lens distortion was modeled in this example using a cubic polynomial in the form of the relationship shown below.

$$h(r) = 0.7316r - 0.0023r^2 + 9 \times 10^{-6} r^3 \quad (7)$$

$$r = (x^2 + y^2)^{1/2} \quad (8)$$

where r is the radial distance from the center of the image;
x is the horizontal coordinate; and
y is the vertical coordinate.

The perspective effects in this example were modeled geometrically using the following transformations:

$$X = \frac{h(r)}{r} u, \quad Y = \frac{h(r)}{r} v \quad (9)$$

$$x = \frac{D}{D + Y \tan(\theta)} X, \quad (10)$$

$$y = \frac{D}{D + Y \tan(\theta)} Y$$

$$x = \frac{D}{D + Y \tan(\theta)} X, \quad (11)$$

$$y = \frac{D}{D + Y \tan(\theta)} Y$$

where $\theta = 30°$.

The unwarping transform $\vec{h}(u,v)$ was calculated from the inverse of the warping transform $\vec{g}(x, y)$. The warped input image is shown on the left in FIGS. 8 and 9 and the unwarped image transformed by the unwarping transform $\vec{h}(u,v)$ is shown on the right. The straight lines in the scene appear curved in the warped image and straight in the unwarped image. The vertical and horizontal orientations of objects are restored in the unwarped image. The pedestrian in the unwarped image on the right is no longer curved and tilted as appears in the warped input image on the left. The integral of warped image regions shown outlined on the left of FIGS. 8 and 9 were used to calculate the corresponding predicted integral of unwarped image regions shown outlined on the right of FIGS. 8 and 9. The results were compared with corresponding integrals performed on actual unwarped images. The error proved to be less than 1.1% for the regions shown in FIGS. 8 and 9. The nonzero error is attributed to quantization and round-off errors in the calculation due to spatial sampling effects and finite precision representation. In these examples, the distorted input image size was 640 columns by 480 rows. The curvilinear regions used to calculate the integral feature values ranged in size from 240×60 pixels to 400×500 pixels.

The invention claimed is:

1. Method for calculating undistorted integral features without generating an undistorted image for use in a computer vision object recognition system, comprising:
within a microprocessor, calculating a distorted integral image delimited by a predetermined region by integrating over the predetermined region the product of a distorted input image captured in a distorted image space and a predetermined vector transformation between an undistorted image space and the distorted image space;
generating the undistorted integral features by adding and subtracting values of the distorted integral image without generating an undistorted image; and
utilizing the undistorted integral features in an object classifier-based computer vision object recognition system; and
wherein the undistorted integral features describe a restricted set of object features for recognition in the input image in the undistorted image space; and
wherein the distorted integral image comprises a numerical sum of image pixel values in the predetermined region of the distorted input image.

2. Method for calculating undistorted integral features from a distorted input image for use in a computer vision object recognition system, comprising:
providing a Jacobian determinant relating a distorted image space to an undistorted image space;
within a microprocessor, calculating and storing a distorted integral image based on the distorted input image and the provided Jacobian determinant; and
calculating undistorted integral features using distorted integral image values comprising:
referencing distorted integral image values of the integral image delimited by a predetermined region; and
algebraically combining the distorted integral image values; and
utilizing the undistorted integral features in an object classifier-based computer vision object recognition system; and
wherein the calculating the distorted integral image is based on the distorted input image without generating an undistorted image;
wherein the undistorted integral features describe a restricted set of object features for recognition in the input image in the undistorted image space; and
wherein the distorted integral image comprises a numerical sum of image pixel values in the predetermined region of the distorted input image.

3. Method for object recognition in a computer vision system having a distorted input image, comprising:
providing an integral feature object classifier trained using an undistorted image space;
providing a transformation mapping of a distorted image space to the undistorted image space;
providing a distorted input image captured in the distorted image space;
within a microprocessor, calculating undistorted integral features based on the distorted input image and the transformation mapping; and
recognizing objects in the distorted input image with an object classifier-based computer vision object recognition system based on the calculated undistorted integral features and the provided integral feature object classifier; and wherein calculating undistorted integral features from the distorted input image based on the transformation mapping comprises integrating over a predetermined region the product of the distorted image and the transformation mapping;

wherein the undistorted integral features describe a restricted set of object features for recognition in the input image in the undistorted image space; and wherein the distorted integral image comprises a numerical sum of image pixel values in the predetermined region of the distorted input image.

4. The method for object recognition as claimed in claim 3 wherein integrating over said predetermined region comprises:
   referencing integral image values of a distorted integral image based on the distorted input image and the provided transformation mapping; and
   algebraically combining the distorted integral image values.

5. The method for object recognition as claimed in claim 3 wherein integrating over said predetermined region comprises:
   calculating and storing a distorted integral image based on the distorted input image and the transformation mapping;
   referencing distorted integral image values of the distorted integral image delimited by the predetermined region; and
   algebraically combining the distorted integral image values.

6. Method for calculating undistorted integral features from a distorted input image for use in a computer vision object recognition system, comprising:
   providing a Jacobian determinant relating a distorted image space to an undistorted image space;
   within a microprocessor, integrating over a predetermined region the product of a distorted input image in the distorted image space and the Jacobian determinant, the integrating determining a distorted integral image;
   calculating the undistorted integral features based upon the determined distorted integral image; and
   utilizing the undistorted integral features in an object classifier-based computer vision object recognition system; and
wherein the undistorted integral features describe a restricted set of object features for recognition in the input image in the undistorted image space; and
wherein the distorted integral image comprises a numerical sum of image pixel values in the predetermined region of the distorted input image.

7. Method for calculating undistorted integral features from a distorted input image for use in a pattern recognition system, comprising:
   monitoring the distorted input image;
   within a microprocessor, determining a distorted integral image in warped space comprising an array of values for every pixel in the monitored distorted input image, wherein each value of the array can be described by a distorted image pixel column number and a distorted image pixel row number and wherein each value of the array comprises a summation of image values of each of the pixels with a lower distorted image pixel column number and a lower distorted image pixel row number;
   defining a rectangular region in unwarped space, wherein the unwarped space is defined by an unwarped space pixel column number and an unwarped space pixel row number and wherein the rectangular region is defined by a high unwarped space pixel row number, a low unwarped space pixel row number, a high unwarped space pixel column number, and a low unwarped space pixel column number;
   determining the integral of the rectangular region in unwarped space by integrating the sum of values of the array in a region in warped space corresponding to the rectangular region; and
   utilizing the integral of the rectangular region to perform pattern recognition; and
wherein the utilizing the integral of the rectangular region to perform pattern recognition comprises:
   iteratively defining rectangular regions in unwarped space;
   determining integrals of each of the rectangular regions in unwarped space;
   determining unwarped integral features for the distorted input image based upon the determined integrals of the rectangular regions; and
   performing pattern recognition upon the determined unwarped integral features with an object classifier-based computer vision object recognition system; and
wherein the undistorted integral features describe a restricted set of object features for recognition in the input image in the undistorted image space.

8. The method of claim 7, wherein determining the distorted integral image in warped space comprising an array of values for every pixel in the monitored distorted input image comprises determining a distorted integral image of a product of the distorted input image and a Jacobian determinant for the warped space.

9. The method of claim 7, wherein the determining the integral of the rectangular region in unwarped space comprises:
   summing the value of the distorted integral image in warped space corresponding to the corner of the rectangle region at the high unwarped space pixel row number and the high unwarped space pixel column number and the value of the distorted integral image in warped space corresponding to the corner of the rectangle region at the low unwarped space pixel row number and the low unwarped space pixel column number; and
   subtracting the sum of the value of the distorted integral image in warped space corresponding to the corner of the rectangle region at the high unwarped space pixel row number and the low unwarped space pixel column number and the value of the distorted integral image in warped space corresponding to the corner of the rectangle region at the low unwarped space pixel row number and the high unwarped space pixel column number.

* * * * *